S. J. BAIRD.

Improvement in Mechanical Movement.

No. 4,795. Reissued March 12, 1872.

Witnesses. { A. H. Notter, Thos. P. Anderson

S. J. Baird, by his attys Howson & Son

THE NORRIS PETERS CO., PHOTO-LITHO., WASHINGTON, D. C.

UNITED STATES PATENT OFFICE.

SAMUEL J. BAIRD, OF WAYNESBOROUGH, VIRGINIA.

IMPROVEMENT IN MECHANICAL MOVEMENTS.

Specification forming part of Letters Patent No. 97,856, dated December 14, 1869; reissue No. 4,795, dated March 12, 1872.

DIVISION B.

SPECIFICATION.

I, SAMUEL J. BAIRD, of Waynesborough, county of Augusta, State of Virginia, have invented a new Mechanical Movement, of which the following is a specification:

*Nature and Object of the Invention.*

My new mechanical movement has for its object the converting of a reciprocating into an intermittent rotary motion in either direction; and consists of a wheel, upon which are a series of teeth, and a reciprocating slide, hav- projections so arranged that on the movements of the slide the projections will alternately strike the teeth of the wheel and impart an intermittent rotary motion to the same. My invention further consists in the combination, with the wheel and slide, of a projection on the latter; so arranged as to insure positive and uniform movements of the wheel.

Figure 1:
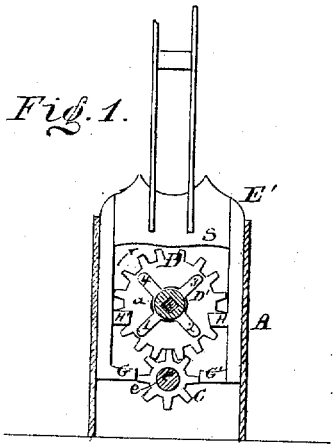
Figure 2:
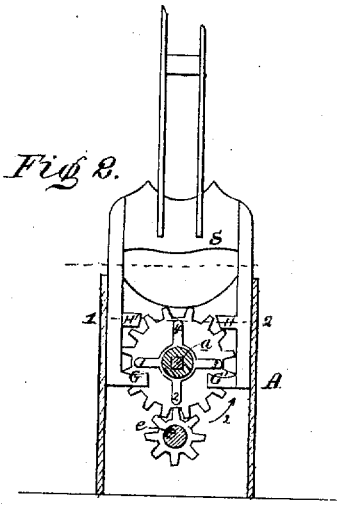
Figure 3:
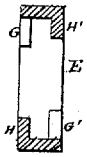

In the accompanying drawing, Figure 1 is a view, partly in section, showing one form in which my improved mechanical movement may be embodied; Fig. 2, the same, showing the parts in a different position; and Fig. 3, a sectional view on the line 1 2, Fig. 2.

In the sides of a case, A, turn the journals of a spindle, *a*, upon which a cog-wheel, D, may be secured, so as to turn with but have a limited sliding motion on the same, the teeth of the cog-wheel gearing into those of a pinion, C, on a shaft, *e*, turning in suitable bearings. Within the case slides a frame, E′, upon which are arranged pins or lugs G H G′ H′, the pins G H being on the one vertical plane, and the lugs G′ H′ on a parallel plane slightly removed from the first, both planes being at right angles to the axis of the wheel D. At the side of the wheel D is a ratchet-wheel, consisting of four equidistant teeth, 1 2 3 4, which are operated on by one or the other pair of lugs, according to the position of the wheel D on its shaft.

The wheel D being adjusted on its shaft, so that the ratchet-teeth shall be struck by the lugs G H as the slide reciprocates, and the parts being in the position shown in Fig. 1, an ascending motion is imparted to the slide, when the lug G will strike the tooth 1 and will carry it to a horizontal position, (Fig. 2,) when the movement of the slide will be arrested. As the slide descends, the lug H will strike the tooth 3, and will turn the wheel until the teeth are in the position shown in Fig. 1, (the teeth 2 3, however, being lowermost,) so that, on the next upward movement of the frame, the tooth 2 will be struck by the lug G, the movement of the frame in each direction thus turning the ratchet-wheel one-fourth of a revolution on its axis in the direction of the arrow, Fig. 1. The movement of the ratchet may be reversed by sliding the ratchet-wheel laterally on its shaft, so that the ratchet-teeth will be acted on by the lugs G′ H′, as shown in Fig. 2, where the tooth 1 is in a position to be struck by the lug H′ as the frame descends, the wheel being thus turned in the direction of the arrow 2. The wheel, instead of being thus adjustable, may be fixed to the shaft, and the frame or slide may be capable of such adjustment that either set of lugs may be brought into contact with the teeth of the wheel. A projection, S, is so arranged on the frame that, as the latter reaches the limit of its movement, the projection will bear on both the adjacent teeth, (Fig. 1,) thus insuring a positive and uniform movement of the wheel, and after each movement retaining the wheel firmly in its position until the next movement of the slide.

*Claims.*

1. A mechanical movement, consisting of a ratchet-wheel and reciprocating slide, either being laterally adjustable, as described, and the slide having lugs which operate alternately to impart to the wheel at each movement of the slide part of a revolution in either direction, substantially as set forth.

2. The combination, with the slide of a bearing, which is brought against the teeth of the wheel on the completion of the movement of the slide, for the purpose specified.

In testimony whereof I have signed my name to this specification in the presence of two subscribing witnesses.

SAMUEL J. BAIRD.

Witnesses:
R. W. BAIRD,
E. E. BAIRD.